(12) United States Patent
Bialas et al.

(10) Patent No.: US 10,962,278 B2
(45) Date of Patent: Mar. 30, 2021

(54) MOUNTING SYSTEMS FOR REFRIGERATION DEVICES

(71) Applicant: Prince Castle LLC, Carol Stream, IL (US)

(72) Inventors: Gwen Bialas, Ashton, IL (US); Eric Pollpeter, Cedarburg, WI (US)

(73) Assignee: Prince Castle LLC, Carol Stream, IL (US)

(*) Notice: Subject to any disclaimer, the term of this patent is extended or adjusted under 35 U.S.C. 154(b) by 124 days.

(21) Appl. No.: 16/395,631

(22) Filed: Apr. 26, 2019

(65) Prior Publication Data
US 2019/0331405 A1    Oct. 31, 2019

Related U.S. Application Data

(60) Provisional application No. 62/664,665, filed on Apr. 30, 2018.

(51) Int. Cl.
*F25D 23/06* (2006.01)
*F25D 25/00* (2006.01)
*A47J 45/00* (2006.01)

(52) U.S. Cl.
CPC ............. *F25D 25/00* (2013.01); *A47J 45/00* (2013.01); *F25D 23/067* (2013.01); *F25D 2323/021* (2013.01)

(58) Field of Classification Search
CPC ...... F25D 25/02; F25D 23/067; F25D 25/025; F25D 25/024; A47F 5/0853
USPC .................................................. 248/222.51
See application file for complete search history.

(56) References Cited

U.S. PATENT DOCUMENTS

| | | | |
|---|---|---|---|
| 3,517,791 A | 6/1970 | Miles | |
| 4,211,379 A * | 7/1980 | Morgan | A47B 96/067 248/222.51 |
| 4,869,378 A | 9/1989 | Miller | |
| 5,180,089 A | 1/1993 | Suman et al. | |
| 5,372,344 A | 12/1994 | Syvuk | |
| 6,533,251 B1 | 3/2003 | Abbaticchio | |
| 6,971,730 B2 * | 12/2005 | Koons | F25D 23/021 312/334.8 |
| 7,669,945 B2 * | 3/2010 | Blersch | F25D 23/067 312/408 |
| 8,066,130 B2 | 11/2011 | Shaha et al. | |
| 8,602,227 B1 * | 12/2013 | McDonald | A47F 5/0853 211/94.01 |
| 9,010,890 B2 * | 4/2015 | Eckartsberg | F25D 23/04 312/408 |

(Continued)

*Primary Examiner* — Bradley Duckworth
(74) *Attorney, Agent, or Firm* — Andrus Intellectual Property Law, LLP

(57) ABSTRACT

A mounting assembly for securing an accessory to a food service apparatus includes a mounting bar having a primary cavity, an open interior, a lip, a projection, and a partition wall that extends between the lip and the projection and separates the primary cavity and the open interior. An anchor bar is received in the open interior and secures the mounting bar to the food service apparatus. A mechanical interface has a projection received into the primary cavity such that the mechanical interface is secured to the mounting bar. The mounting bar prevents rotation of the projection out of the primary cavity, and the mechanical interface is configured to be secured to the accessory such that the accessory is secured to the food service apparatus.

18 Claims, 11 Drawing Sheets

(56) References Cited

U.S. PATENT DOCUMENTS

| | | | | |
|---|---|---|---|---|
| 9,103,581 B2* | 8/2015 | Babinski | ............... | F25D 25/025 |
| 9,366,470 B2* | 6/2016 | Hasturk | ................ | A47F 3/0482 |
| 9,389,012 B2* | 7/2016 | Rackley | ................. | F25D 23/04 |
| 9,816,746 B1* | 11/2017 | Haney | .................. | F25D 25/025 |
| 10,281,196 B2* | 5/2019 | Seeley | ................. | F25D 23/067 |
| 10,281,197 B2* | 5/2019 | Ammerman | ........... | A47B 96/07 |
| 10,451,338 B2* | 10/2019 | Cordero | ................ | F25D 11/02 |
| 10,591,204 B2* | 3/2020 | Seo | ...................... | F25D 25/025 |
| 10,634,420 B2* | 4/2020 | Wantland | .............. | F25D 23/066 |
| 2007/0085457 A1* | 4/2007 | Park | ..................... | F25D 23/067 |
| | | | | 312/402 |
| 2007/0210089 A1* | 9/2007 | Kauk | ..................... | B29C 44/16 |
| | | | | 220/592.1 |
| 2018/0031308 A1* | 2/2018 | Yang | .................... | F25D 23/062 |

* cited by examiner

MOUNTING SYSTEMS FOR REFRIGERATION DEVICES

CROSS-REFERENCE TO RELATED APPLICATION

The present application claims priority of U.S. Provisional Patent Application No. 62/664,665, filed on Apr. 30, 2018, the contents of which are hereby incorporated by reference in its entirety.

BACKGROUND

The present disclosure relates to the field of refrigeration. More specifically, the present disclosure relates to solutions for mounting components and/or accessories on the surfaces of equipment used in the food service industry and more specifically refrigeration systems for the food service industry.

Equipment used in the handling and preparation of food presents a unique set of challenges. Limited space is often available for equipment in a food service setting. Therefore, food service equipment is desired to exhibit a minimized footprint for the need and it is desirable that equipment be flexible in arrangement and configuration to be adapted for use in a constrained space. Additionally, because the equipment is used in the handling and preparation of food, equipment surface standards must be met for cleanability. Finally, because refrigeration systems are creating an environment with different thermal conditions (e.g. temperature, humidity) solutions are desired that maintain insulative barriers between the environmentally controlled portion of the refrigerator and the ambient.

BRIEF DISCLOSURE

An exemplary embodiment of a mounting assembly for securing an accessory to a food service apparatus includes a mounting bar having a primary cavity, an open interior, a lip, a mounting projection, and a partition wall that extends between the lip and the mounting projection and separates the primary cavity and the open interior. An anchor bar is received in the open interior and secures the mounting bar to the food service apparatus. A mechanical interface has a projection received into the primary cavity such that the mechanical interface is secured to the mounting bar. The mounting bar prevents movement of the projection out of the primary cavity, and the mechanical interface is configured to be secured to the accessory such that the accessory is secured to the food service apparatus.

An exemplary embodiment of a mounting system for a food service apparatus includes a unitary wall for the food service apparatus. The unitary wall includes an upper wall and a lower wall planar to the upper wall. The unitary wall defines a channel between the upper wall and the lower wall. The channel is defined by a channel top, a channel back, and a channel bottom formed of the unitary wall. A mounting bar is secured to the unitary wall within the channel. A mechanical interface is coupled to an accessory. The mechanical interface is releasably engaged with the mounting bar to support the accessory on the unitary wall.

In additional embodiments, the mounting bar engages at least two of the channel top, the channel back, and the channel bottom. The mounting bar may have a top wall and a bottom wall and at least one of the top wall and the bottom wall engage one of the channel top and the channel bottom of the unitary wall. The mounting bar may include opposing arms that extend inwardly toward each other from the top wall and the bottom wall. The opposing arms may engage the channel back. An open interior of the mounting bar may be defined by the top wall, the bottom wall, and the opposing arms. An anchor bar may extend within the open interior and secure the mounting bar to the unitary wall. The mounting bar may slide relative to the anchor bar to receive the anchor bar within the open interior of the mounting bar. A threaded fastener may secure the anchor bar to the channel back and place a compressive force on the anchor bar that compresses at least one of the opposing arms against the channel back.

In further embodiments, the mounting bar may include a primary cavity defined by a partition wall of the mounting bar that extends between the top wall and the bottom wall. The primary cavity may be configured to receive a projection of the mechanical interface to engage the mechanical interface with the mounting bar. The primary cavity may be further defined by a lip of the mounting bar that extends downwardly from the top wall at an end of the partition wall. The projection of the mechanical interface, when received in the primary cavity, may simultaneously engage the lip and the partition wall. The mounting bar may bar resiliently deform to releasably engage the projection of the mechanical interface within the primary cavity. The top wall may engage the channel top and the bottom wall is spaced apart from the channel bottom thereby defining a secondary cavity between the bottom wall and the channel bottom. The mechanical interface may further include a tab spaced apart from the projection of the mechanical interface. The tab is received within the secondary cavity when the mechanical interface engages the mounting bar. When received in the secondary cavity, the tab may simultaneously engage the bottom wall and the channel bottom. The mechanical interface may further include an engagement arm that extends generally perpendicular to the tab. When the mechanical interface engages the mounting bar, the engagement arm engages the lower wall of the unitary wall. One of the bottom wall and the tab may resiliently deform when the tab engages the bottom wall.

In embodiments, the food service apparatus may be a refrigerator. The accessory may be a shelf. The accessory may extend between a first mechanical interface and a second mechanical interface.

DETAILED DISCLOSURE

Figure 1:
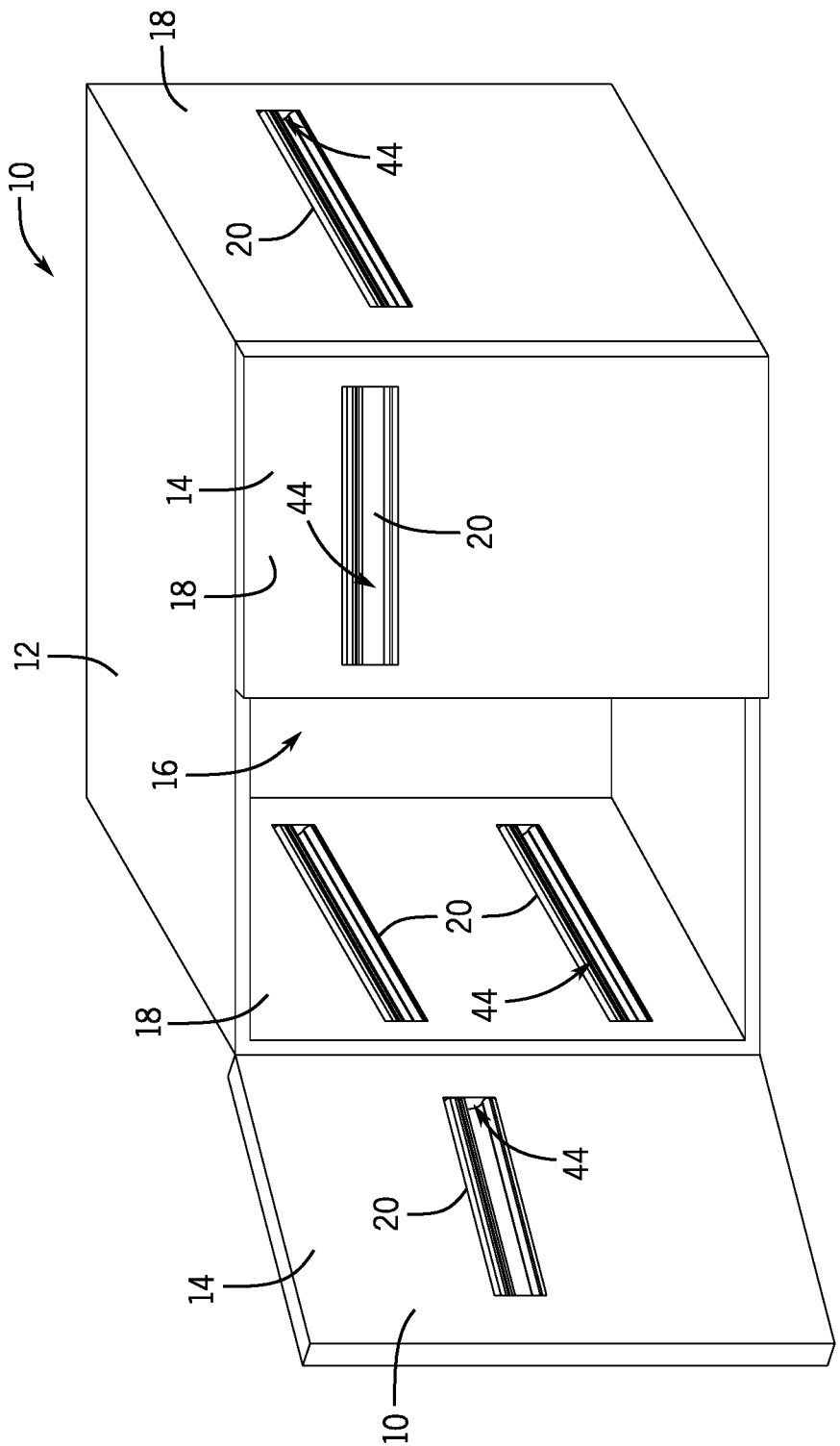
FIG. 1 depicts an exemplary embodiment of a refrigeration device.

FIG. 1 depicts an exemplary embodiment of a food service apparatus. In this exemplary embodiment, the food service apparatus is a refrigeration device 10 exemplarily depicted as a two-door under counter refrigerator. Other non-limiting examples of refrigeration devices include under counter freezers, refrigerated preparation tables, chef base preparation tables, upright refrigerators, or upright freezers. However, it will be understood that embodiments of food service apparatuses may include any of a variety of different types of refrigeration devices 10, food processing devices, food cooking devices, and/or food storage devices that may be used in a kitchen or food preparation setting. It will be recognized that the mounting assembly disclosed herein may be used in connection with any type of food service apparatus.

The refrigeration device 10 exemplarily includes a cabinet 12 and two doors 14 which define a compartment 16 which is environmentally controlled, including, but not limited to control with respect to temperature by a cooling system (not depicted) of the refrigeration device 10. The cabinet 12 is further defined by walls 18 which are exemplarily provided on an interior and an exterior of the cabinet 12 and may be constructed of sheet metal, for example stainless steel. Each wall 18 is exemplary constructed as a single piece of sheet metal that is bent to form one or more channels 44 in which mounting bars 20, which are described hereinbelow, are received. The size and shape of the channels 44 correspond to the size and shape of the mounting bars 20. The exemplary refrigeration device 10 includes multiple channels 44 in which the mounting bars 20 are located such that mounting bars 20 are located on and in refrigeration device 10 at a variety of positions. For example, the mounting bars 20 may be provided in the interior and exterior walls of the cabinet 12 and/or may be provided in the interior or exterior walls of the doors 14. In certain exemplary embodiments, the mounting bars 20 are recessed or at least partially recessed in the walls 18.

Figure 2:
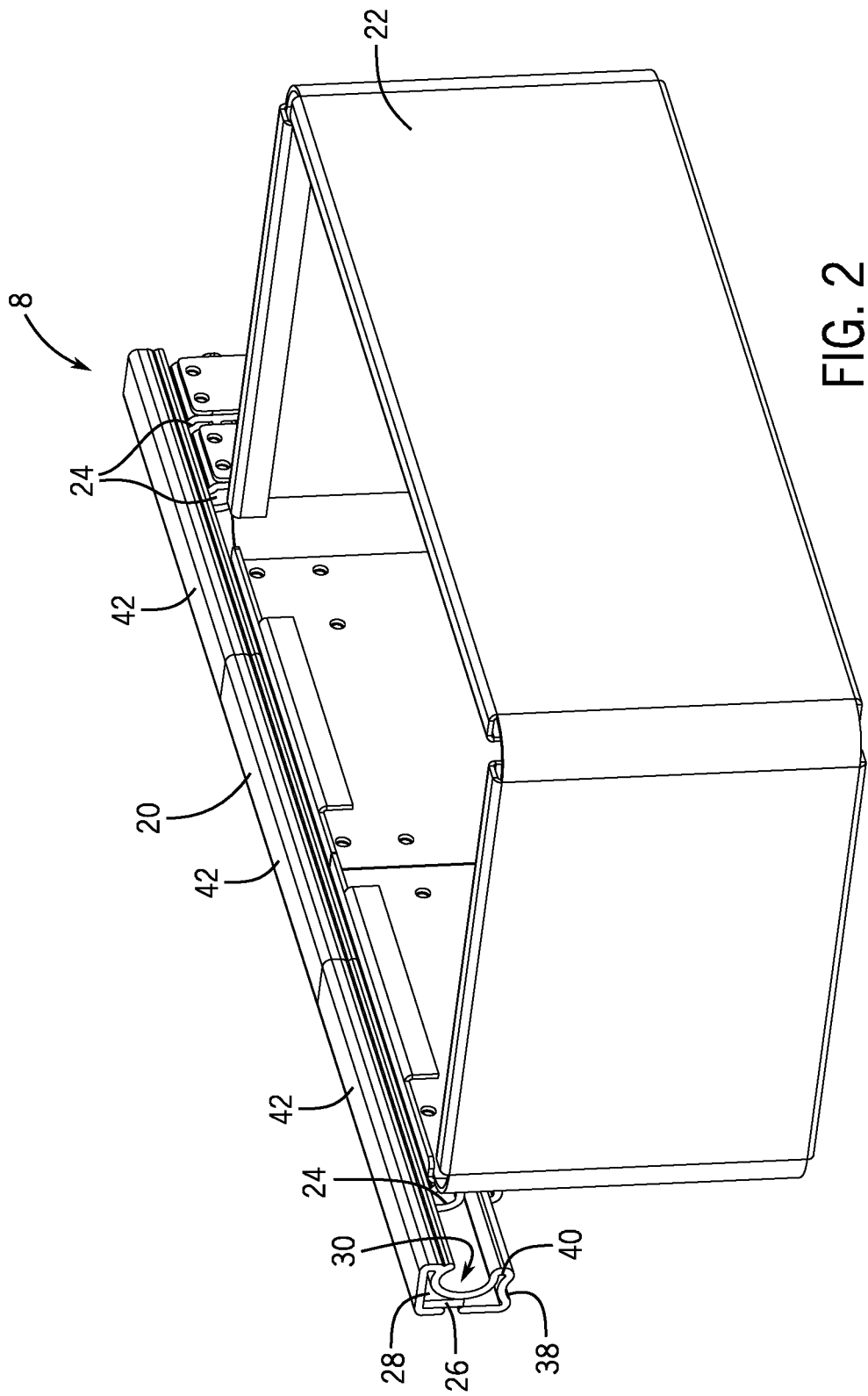
FIG. 2 depicts an exemplary embodiment of an accessory connected to a mounting bar.

FIG. 2 depicts an exemplary embodiment of a mounting assembly 8. The mounting assembly 8 exemplarily has a mounting bar 20 and a mechanical interface 24 with an accessory, for example a basket 22, secured thereto. As described in further detail herein, the mounting bar 20 facilitates the connection of an accessory, such as the basket 22 shown in FIG. 2, to a refrigeration device 10 as exemplarily depicted in FIG. 1. The mounting bar 20 is exemplarily constructed of a resilient material, for example a plastic or elastomeric material, that facilitates an interconnection between the mechanical interface 24 and the mounting bar 20, the mechanical interface 24 will be described in further detail herein. In exemplary embodiments, the mechanical interface 24 connects to the mounting bar 20 with a friction or interfering fit. The connection between the mechanical interface 24 and the mounting bar 20 is a reversible connection such that the mechanical interface 24 and the mounting bar 20 may be repeatedly connected and disconnected.

Figure 3:
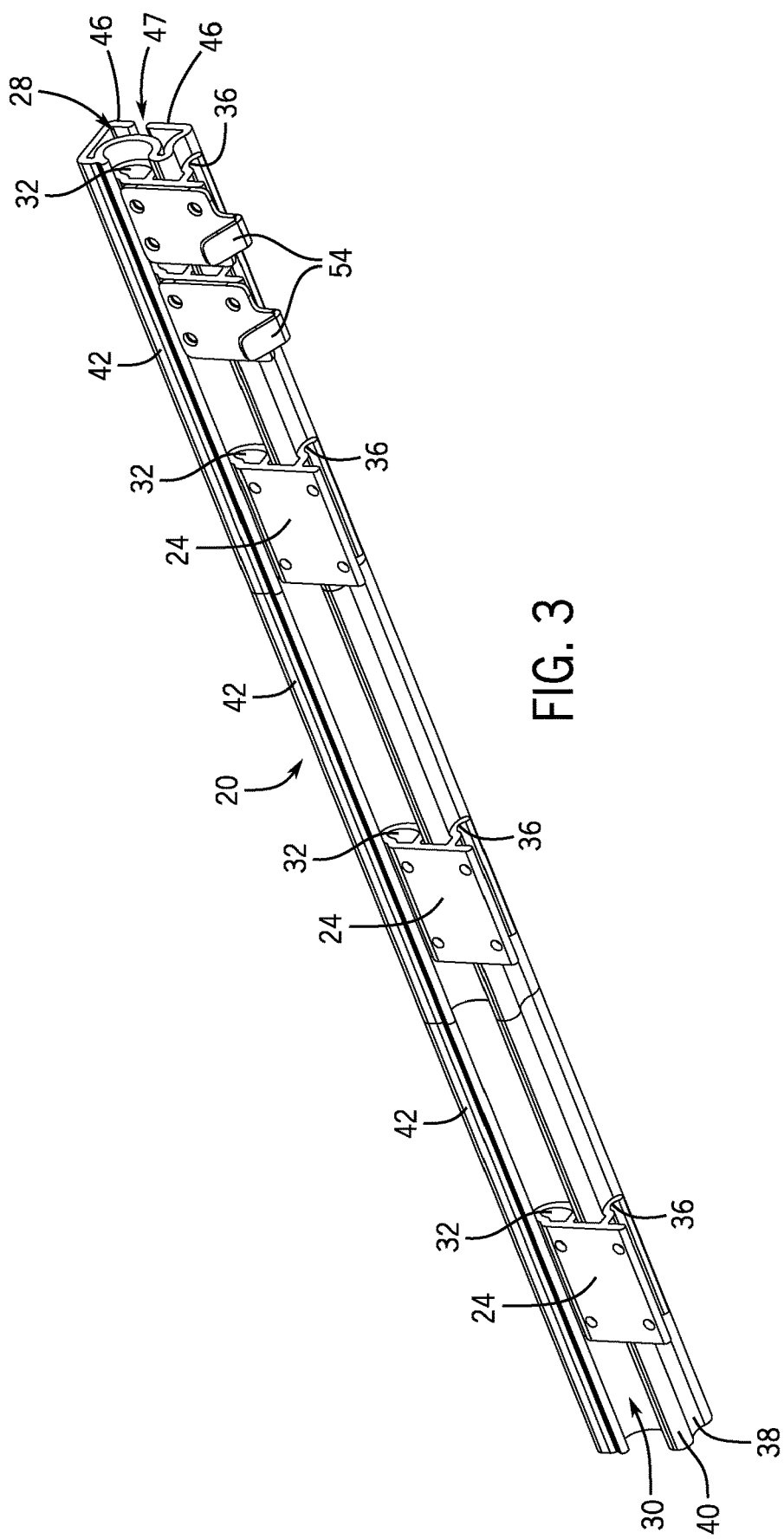
FIG. 3 is a perspective view of an exemplary embodiment of a mounting bar and multiple mechanical interfaces connected thereto.

FIG. 3 depicts an exemplary embodiment of the mounting bar 20 to which multiple mechanical interfaces 24 are connected. Each mechanical interface 24 can be independently connected and disconnected from the mounting bar 20, and in certain exemplary embodiments, each mechanical interface 24 is slidable along the mounting bar 20 into different positions. The mounting bar 20 may be provided in a plurality of sections 42, as shown in FIGS. 2 and 3. This may exemplarily facilitate manufacturing and/or assembly as standardized sizes of extrusion may be manufactured and used in certain exemplary embodiments. In still further exemplary embodiments, the extrusion of the mounting bar 20 may be cut to length and thus provided as a unitary structure secured to the refrigeration device 10 within a respective channel 44.

Figure 4:
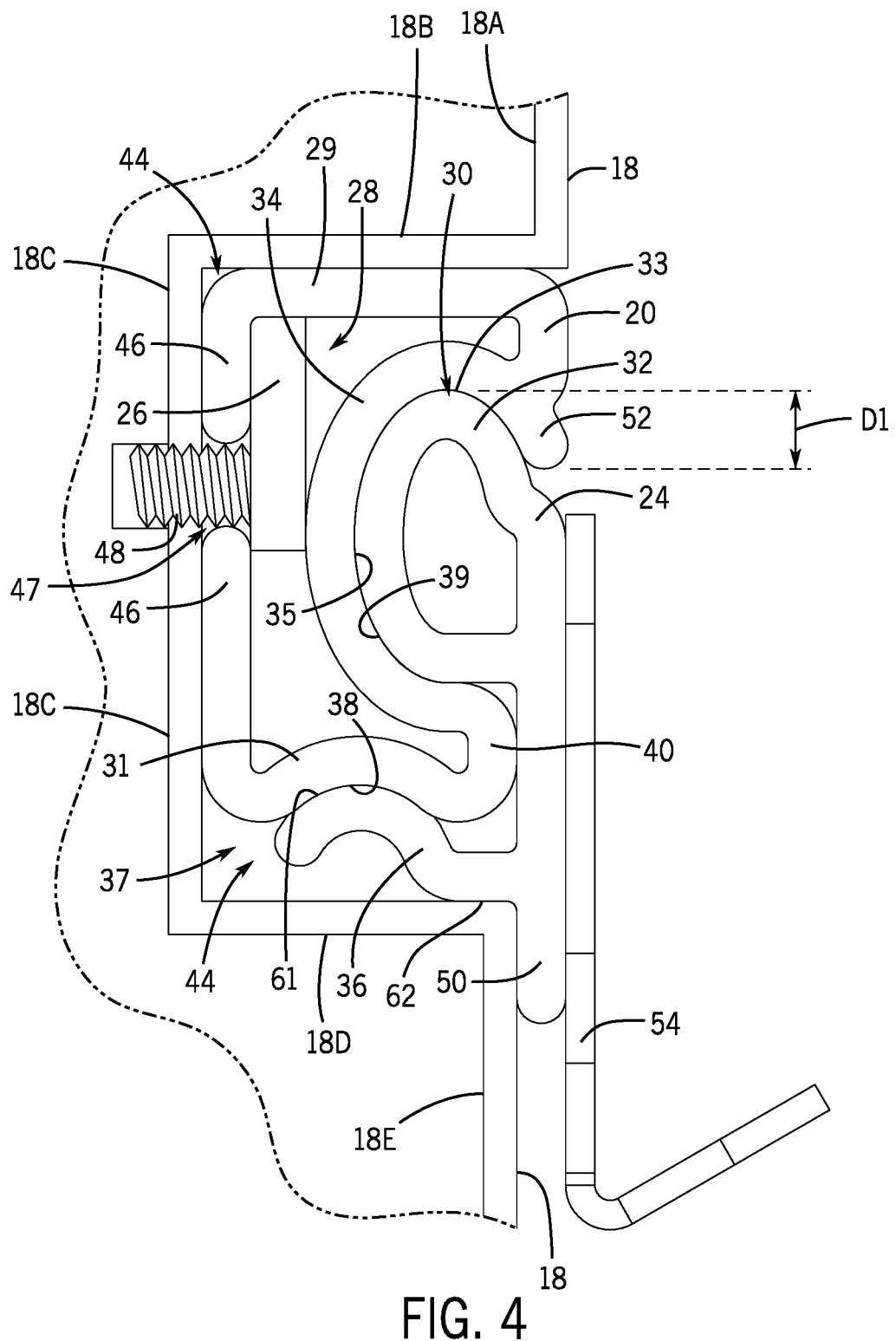
FIG. 4 is an end view of an exemplary embodiment of a mounting bar and a mechanical interface.

Referring now to FIG. 4, an end view of an exemplary embodiment of a mounting bar 20 and a mechanical interface 24 attached thereto is depicted. The mounting bar 20 is depicted as received in the channel 44 and secured to the wall 18 of a refrigeration device 10 (see FIG. 1).

As noted above, the wall 18 is provided from a sheet of metal and the channel 44 is formed by bending the sheet metal. This exemplarily forms the wall 18 and the channel 44 with an upper wall 18A above the channel 44, a channel top 18B, a channel back 18C, a channel bottom 18D, and a lower wall 18E below the channel 44. The channel top 18B, channel back 18C, and channel bottom 18D form the channel 44. The channel 44 is open in the direction opposite the channel back 18C. A plane is formed by the upper wall 18A and the lower wall 18E, and because the channel 44 is formed by bending the sheet metal of the wall 18, the channel 44 is provided without seams, or joints within which food or moisture may be trapped, bacteria or mold may grow, or air may pass either into or out of the environmentally controlled compartment 16. In combination with the mounting bars 20, as are described in detail herein, this provides mounting and reconfigurations options for food service equipment, particularly, but not limited to refrigeration devices 10 that provide improved maintenance of environmental conditions, sanitary condition, and cleaning.

The mounting bar 20 is configured to be received and held within the channel 44. As shown in FIG. 4, the mounting bar 20 may engage two of the channel top 18B, channel back 18C, or channel bottom 18D, or all three. The mounting bar 20 is constructed of a plastic or elastomeric material. In certain embodiments, the mounting bar 20 includes a top wall 29 and a bottom wall 31. These directly or indirectly connect to a partition wall 34. An open interior 28 of the mounting bar 20 is defined interior of the top wall 29, bottom wall 31, and the partition wall 34. A rear of the mounting bar 20 and the open interior 28 thereof is defined by opposing arms 46 which respectively extend from the top wall 29 and the bottom wall 31 towards a slit 47 defined therebetween.

An anchor bar 26, which is shown and described in further detail herein, is positioned within an open interior 28 of the mounting bar 20 and secures the mounting bar 20 to the channel back 18C of the refrigeration device 10 (see FIG. 1). In exemplary embodiments, the anchor bar 26 extends in a longitudinal direction along the mounting bar 20 and within the channel 44 (see arrow A on FIG. 5). The anchor bar 26 is exemplarily secured to the channel back 18C by one or more fasteners 48. The fasteners 48 can exemplarily be threaded fasteners which can provide an adjustable or refinable engagement between the anchor bar 26 and the channel back 18C. In an exemplary embodiment, the fasteners 48 are received in threaded holes 49 in the material of the wall 18, exemplarily at the channel back 18C. In an embodiment, the threaded holes 49 are through-holes through the material of the channel back 18C, while in other embodiments, as depicted in FIG. 3, the threaded holes 49 are blind holes. This may include an additional piece of material into which the threaded holes 49 extend. Embodiments with blind holes can further provide isolation between the controlled environment of the compartment 16 and the rest of the refrigeration device 10. In embodiments wherein the channel 44 and the mounting bar 20 are located in an exterior wall 18 of the refrigeration device 10, the blind holes can further prevent infiltration of exterior air into the refrigeration device 10.

As noted above, the mounting bar 20 has opposing arms 46 that define a slit 47 that is open to the open interior 28. The one or more fasteners 48 extend through the slit 47 and are secured to the anchor bar 26. The threaded fasteners 48 secure the anchor bar 26 within the channel 44. The bottom of the blind holes and the respective length of the threaded fasteners 48 can define a minimum distance between the channel back 18C and the open interior 28 of the mounting bar 20, within which the opposing arms 46 and the anchor bar 26 may be received as described herein. The anchor bar 26, when positioned in the open interior 28 of the mounting bar 20 and against the opposing arms 46, secures the mounting bar 20 to the wall 18 of the refrigeration device 10 (FIG. 1). The engagement between the mounting bar 20 and the anchor bar 26 within the channel 44 may take different forms. In one embodiment, the anchor bar 26 is fixed, for example as described above, within the channel 44. The mounting bar 20 may be slidingly positioned over the mounting bar, for example by inserting the mounting bar 20 from one end of the channel 44 and sliding the mounting bar 20 lengthwise over the anchor bar 26. In another embodiment, the threaded fasteners 48 may be threaded into the anchor bar 26 and tightened from a side of the wall 18 opposite the mounting bar 20.

Figure 5:
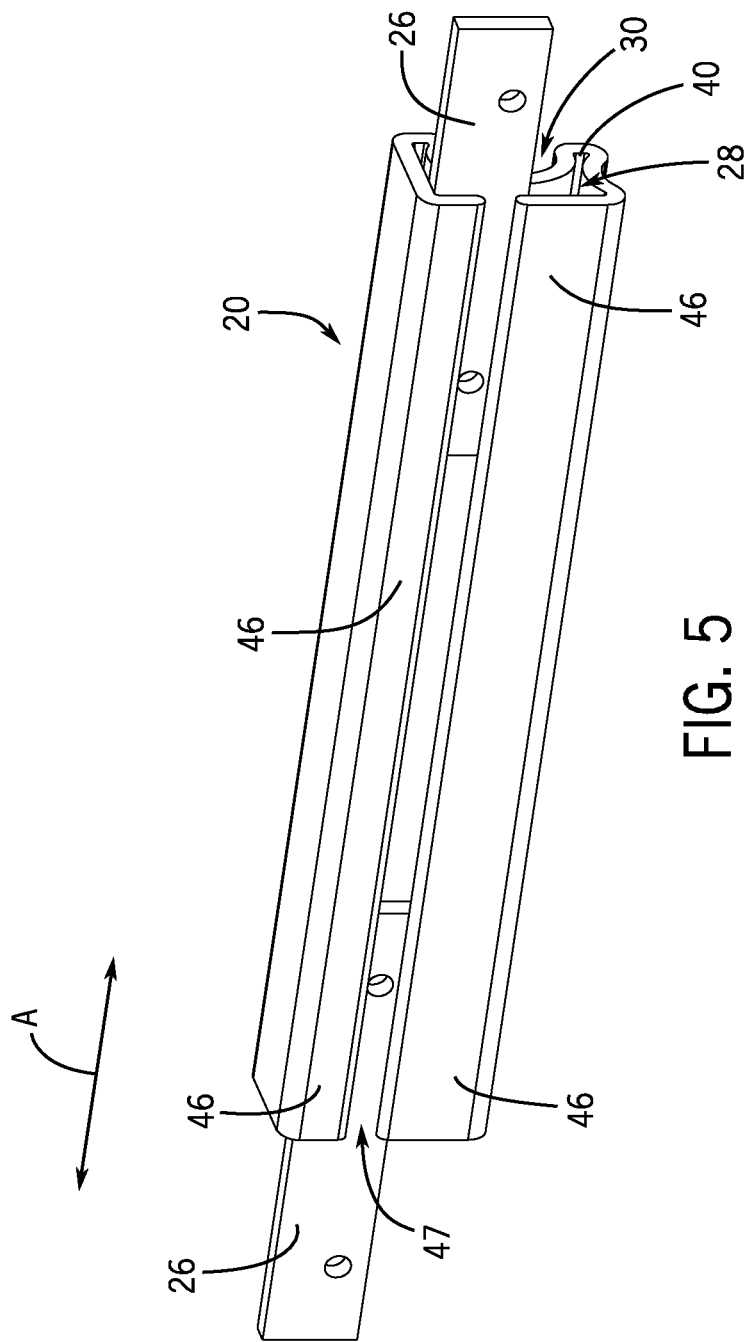
FIG. 5 is a rear perspective view of an exemplary embodiment of a mounting bar and two anchor bars.

The mounting bar 20 may further be configured to expose the threaded fasteners 48 through the partition wall 34 for tightening of the anchor bar 26 against the mounting bar 20. The anchor bar 26 may compress one or both arms 46 between the wall 18 and the anchor bar 26 or otherwise resiliently secure the arms 46 between the anchor bar 26 and the wall 18. FIG. 5 is a rear perspective view of an exemplary embodiment of a mounting bar 20 wherein the anchor bar 26 and the arms 46 are better seen. In an exemplary embodiment, the arms 46 extend in the same plane (e.g. a first plane) and are coplanar with each other. In still further embodiments, the mounting bar 20 may be received and held within the channel 44 by a friction or interference fit whereby elastic deformation of the mounting bar 20 produced a retentive force between the mounting bar 20 and the wall 18 about the channel 44.

The mounting bar 20 further defines a primary cavity 30 which is configured to receive a projection 32 of the mechanical interface 24 as is described in further detail herein. The top wall 29 is connected to a lip 52, and a partition wall 34. The lip 52 and the partition wall 34 define the primary cavity 30. In embodiments, the bottom wall 31 is connected to a mounting projection 40 which, in turn connects to the partition wall 34. Thus, the partition wall 34 extends between the lip 52 and the mounting projection 40. The projection 32 of the mechanical interface 24 is received within the primary cavity and held in place through engagement with at least some of, if not each of the partition wall 34, lip 52, and the mounting projection 40. The mounting projection 40 is positioned below the projection 32 when the projection 32 is received within the primary cavity 30. The partition wall 34 is exemplarily curved and has a concave surface 35. In certain exemplary embodiments, the arms 46, the lip 52, the partition wall 34, and the mounting projection 40 are continuously connected to each other and thereby the mounting bar 20 has a cross-section which may be formed via an extrusion process.

As is briefly noted above, the primary cavity 30 receives the projection 32 of the mechanical interface 24 such that the mechanical interface 24 is secured to the mounting bar 20. In exemplary embodiments, the projection 32 is exemplarily shaped to be congruent with the primary cavity 30, for example with the concave surface 35 such that mechanical interface 24 and the mounting bar 20 engage with a friction and/or interference fit. As such, the mounting bar 20 prevents movement (e.g. rotation) of the projection 32 out of the primary cavity 30. In certain exemplary embodiments, the projection 32 has a generally convex surface 39 that corresponds to the concave surface 35 of the partition wall 34. As exemplarily provided by the lip 52, at least a portion of the mounting bar 20 extends exterior, that is away from the channel back 18C, or at least a portion of the mechanical interface 24. In an embodiment, the lip 52 is exterior of the convex surface 39 of the projection 32 and exterior of a peak 33 of the projection 32. As such, when the projection 32 is received into the primary cavity 30 the convex surface 39 extends along the concave surface 35. In an exemplary embodiment, a portion of the partition wall 34 of the mounting bar 20 may deform or flex in order to accommodate the projection 32 within the primary cavity 30.

In exemplary embodiments, the lip 52 is configured to prevent rotation of the projection 32 out of the primary cavity 30. In exemplary embodiments, the lip 52 extends from the top wall 29 toward the bottom wall 31 and mounting projection 32 and the end of the lip 52 is spaced apart from a peak 33 of the projection 32 (see D1 on FIG. 4). Accordingly, when the projection 32 is received into the primary cavity 30 the position and orientation of the peak 33 relative to the lip 52 prevents rotation of the projection 32 out of the primary cavity 30.

Additionally, in exemplary embodiments, the mechanical interface 24 includes a tab 36 or secondary projection that is configured to be received within a secondary cavity 37 and engage an engagement surface 38 of the bottom wall 31 of the mounting bar 20 to thereby further retain the mechanical interface 24 in engagement with the mounting bar 20. The mounting bar 20 may be secured within the channel 44 at a position with at least one of the top wall 29 spaced from the channel top 18B and the bottom wall 31 spaced from the channel bottom 18D, as depicted in FIG. 4. The space between the channel bottom 18D and the engagement surface 38 of the bottom wall 31 exemplarily defines the secondary cavity 37. The tab 36 has a first bearing surface 61 that, when the tab 36 is received within the secondary cavity 37, engages the engagement surface 38. In exemplary embodiments, the engagement surface 38 is generally concave-shaped and the first bearing surface 61 is generally convex-shaped such that the engagement surface 38 and the first bearing surface 61 matingly engage with a friction and/or interference fit. In exemplary embodiments, the mounting projection 40 and/or the bottom wall 31 at the engagement surface 38 and/or the tab 36 may resiliently deform during engagement. In exemplary embodiments, the tab 36 is received into the channel 44 defined in the wall 18 and engages the bottom wall 31 and/or the mounting projection 40. In exemplary embodiments, the tab 38 has a bearing surface 62 on a side opposite the first bearing surface 61 in a direction oriented towards the channel bottom 18D. The bearing surface 62 may engage the channel bottom 18D to thereby further prevent rotation of the projection 32 out of the primary cavity 30, or rotation of the tab 36 out of the secondary cavity 37 within which the tab 36 is received. In exemplary embodiments, the tab 36 and the bottom wall 31 generally extend in the same direction (e.g. a first direction).

The mounting projection 40 is thus exemplarily secured between the projection 32 and the tab 36, when the mechanical interface 24 is secured to the mounting bar 20.

In certain exemplary embodiments, the mechanical interface 24 includes an engagement arm 50 configured to extend along and engage a portion of the lower wall 18E to thereby provide an additional point of contact to secure the mechanical interface 24 in engagement with the mounting bar 20 and the wall 18. As such, the engagement of the engagement arm 50 with the lower wall 18E further prevents rotation of the projection 32 out of the primary cavity 30. In certain exemplary embodiments, the engagement arm 50 extends perpendicular from the tab 36, or at least a portion of the tab 36, while as described above, the tab 36 may include an, exemplarily convex, engagement portion.

While exemplary features of the mounting bar 20 and the mechanical interface 24 have been described in detail hereinabove with respect to FIGS. 1-4, it will be recognized that a variety of alternative configurations of mounting bars 20 and mechanical interfaces 24 may be constructed while remaining within the scope of the present disclosure. Sample alternative exemplary embodiments of mounting bars 20, mechanical interfaces 24, and arrangements thereof depicted in FIGS. 6-8 are described hereinbelow for exemplary purposes and are meant to be instructive rather than restrictive of embodiments within the scope of the present disclosure.

Figure 6:
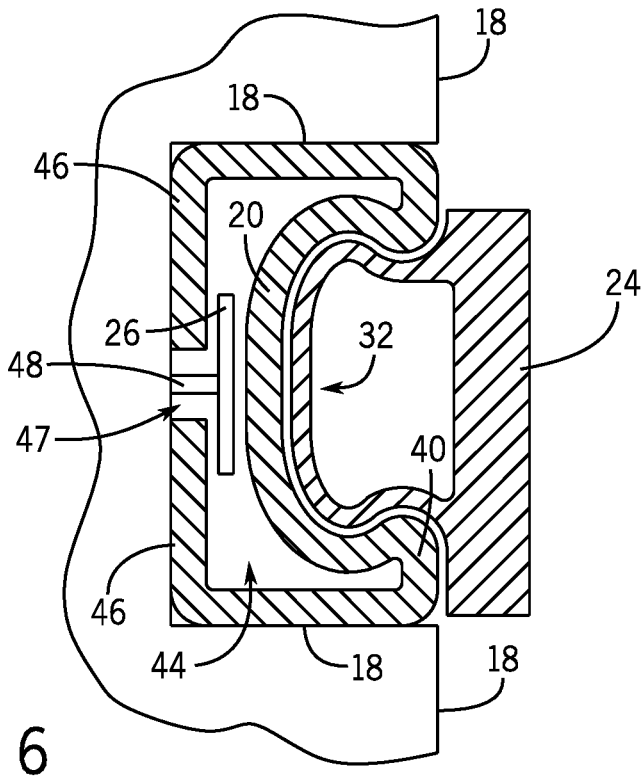
FIGS. 6-10 are end views of different exemplary embodiments of a mounting bar and a mechanical interface.

Referring to FIG. 6, an exemplary embodiment of a mounting bar 20 extends to contact with three sides of the channel 44. The mounting bar 20 has a primary cavity 30 in which the projection 32 of the mechanical interface 24 is received, as described above with reference to FIGS. 1-4. In this exemplary embodiment, the tab 36 of the mechanical interface 24, which is depicted in FIG. 4, is excluded and the mounting projection 40 of the mounting bar 20 contacts the wall 18.

Figure 7:
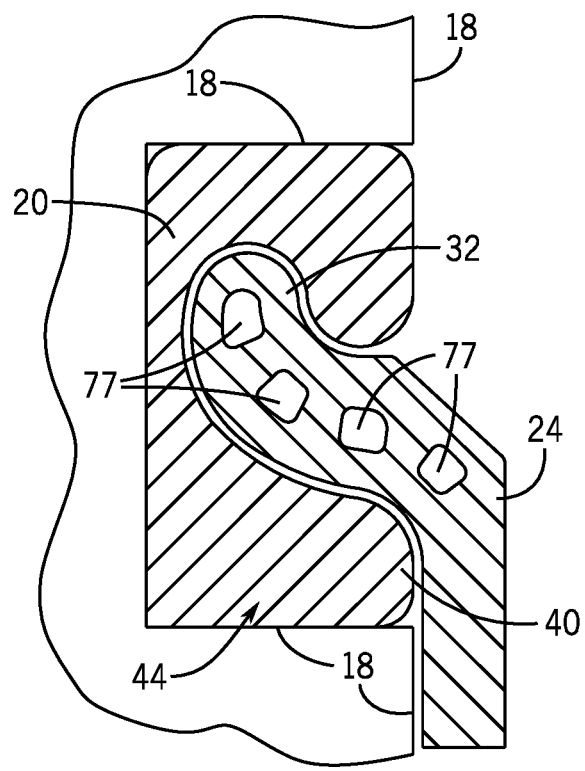

Referring to FIG. 7, an exemplary embodiment of a mounting bar 20 extends to contact three sides of the channel 44 and has a primary cavity 30 in which the projection 32 of the mechanical interface 24 is received as described above. The mounting bar 20 has a generally solid cross-section, and the mounting bar 20 is secured to the wall 18 and in the channel 44 by friction (e.g. the mounting bar 20 friction fits into the channel 44). The exemplary embodiment of the projection 32 of the mechanical interface 24 has apertures 77 defined therein. Like the exemplary embodiment depicted in FIG. 6, the mechanical interface 24 excludes the tab 36 and the mounting projection 40 of the mounting bar 20 directly contacts the wall 18.

Figure 8:
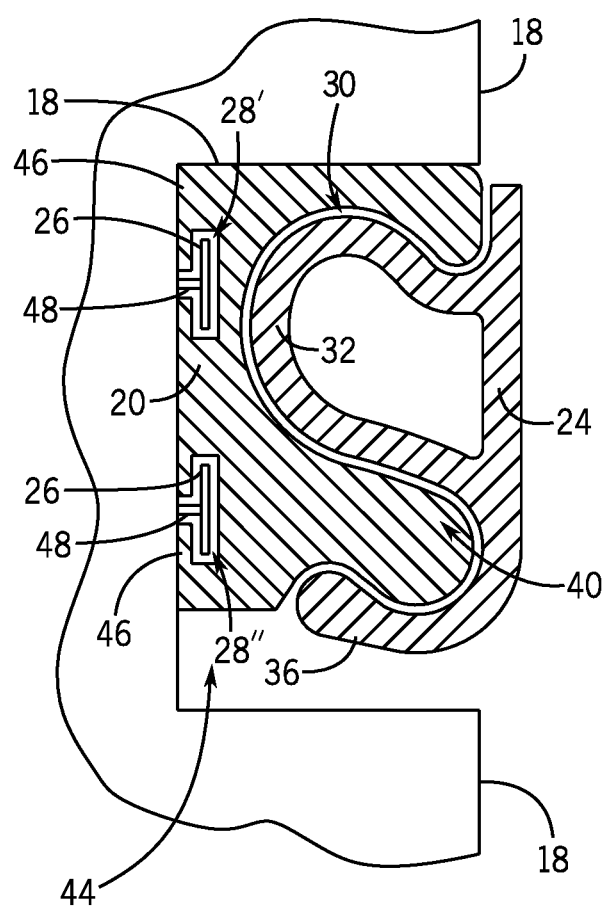

Referring to FIG. 8, an exemplary embodiment of a mounting arm 20 has a first open interior 28' and a second open interior 28". A separate anchor bar 26 is received into the first open interior 28' and the second open interior 28", and fasteners 48 secure the anchor bars 26 to the wall 18 such that the mounting bar 20 is secured to the wall 18. The exemplary embodiment of the tab 36 of the mechanical interface 24 is hook-shaped to thereby increase engagement between the tab 36 and the mounting projection 40.

Figure 9:
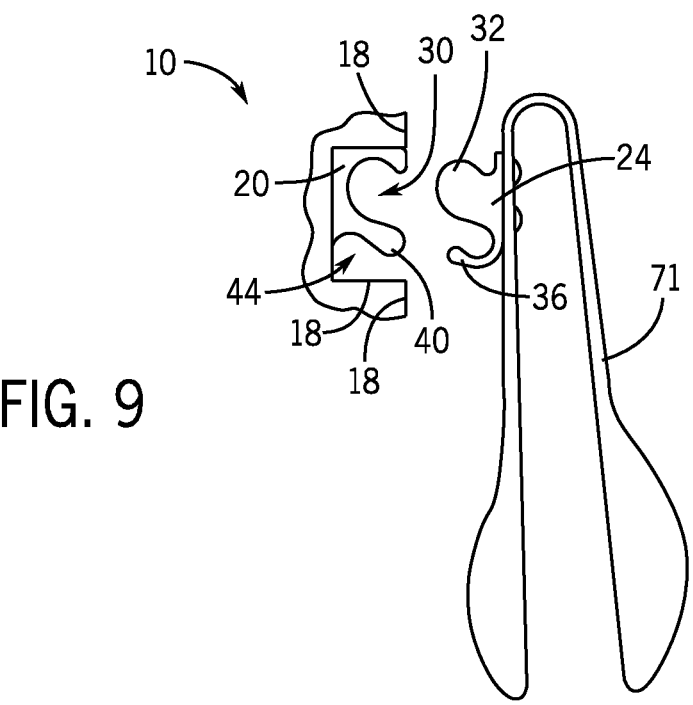

Referring back to FIG. 2-4, FIG. 2 depicts an accessory of a basket 22 and FIGS. 3-4 further depict an accessory of a hook 54. It will be recognized that a variety of other types of accessories may be used with a mechanical interface 24 to secure those accessories to a mounting bar 20 in the wall 18 of a refrigeration device. Sample alternative exemplary embodiments of accessories are depicted in FIGS. 9-12 and are described hereinbelow for exemplary purposes and are meant to be instructive rather than restrictive of embodiments within the scope of the present disclosure FIG. 9 depicts an exemplary embodiment of a tong 71 connected to a mechanical interface 24. A mounting bar 20 is positioned in a channel 44 and secured to the wall 18. As is described above, the projection 32 of the mechanical interface 24 is received into the primary cavity 30 of the mounting bar 20 to thereby connect the mechanical interface 24 to the mounting bar 20 and thereby secure the tong 71 to the wall 18.

Figure 10:
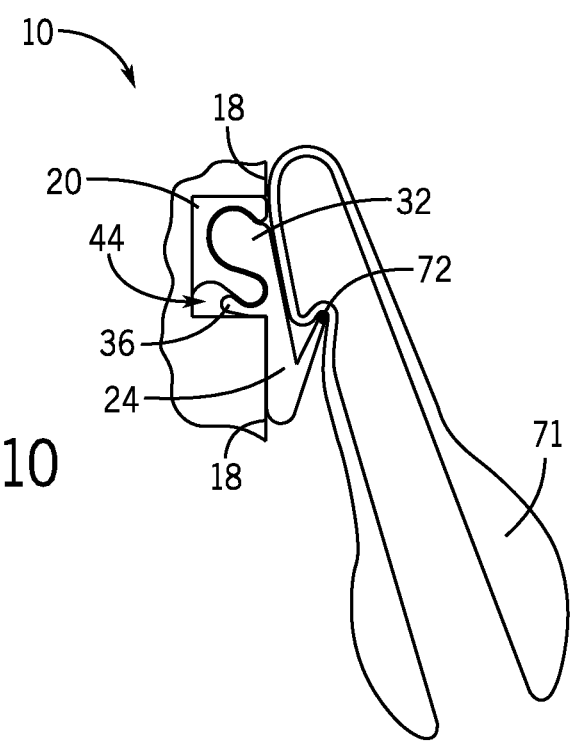

FIG. 10 depicts another exemplary embodiment of a tong 71. In this example, the mounting bar 20 is secured to the wall 18 and the mechanical interface 24 is connected to the mounting bar 20, as described above. The mechanical interface 24 has a hook member 72 that extends away from and is integrally formed with the projection 32 and the tab 36. The hook member 72 is configured to connect with the tong 71, and the tong 71 can be disconnected from the mechanical interface 24 without disconnecting the mechanical interface 24 from the mounting bar 20.

Figure 11:
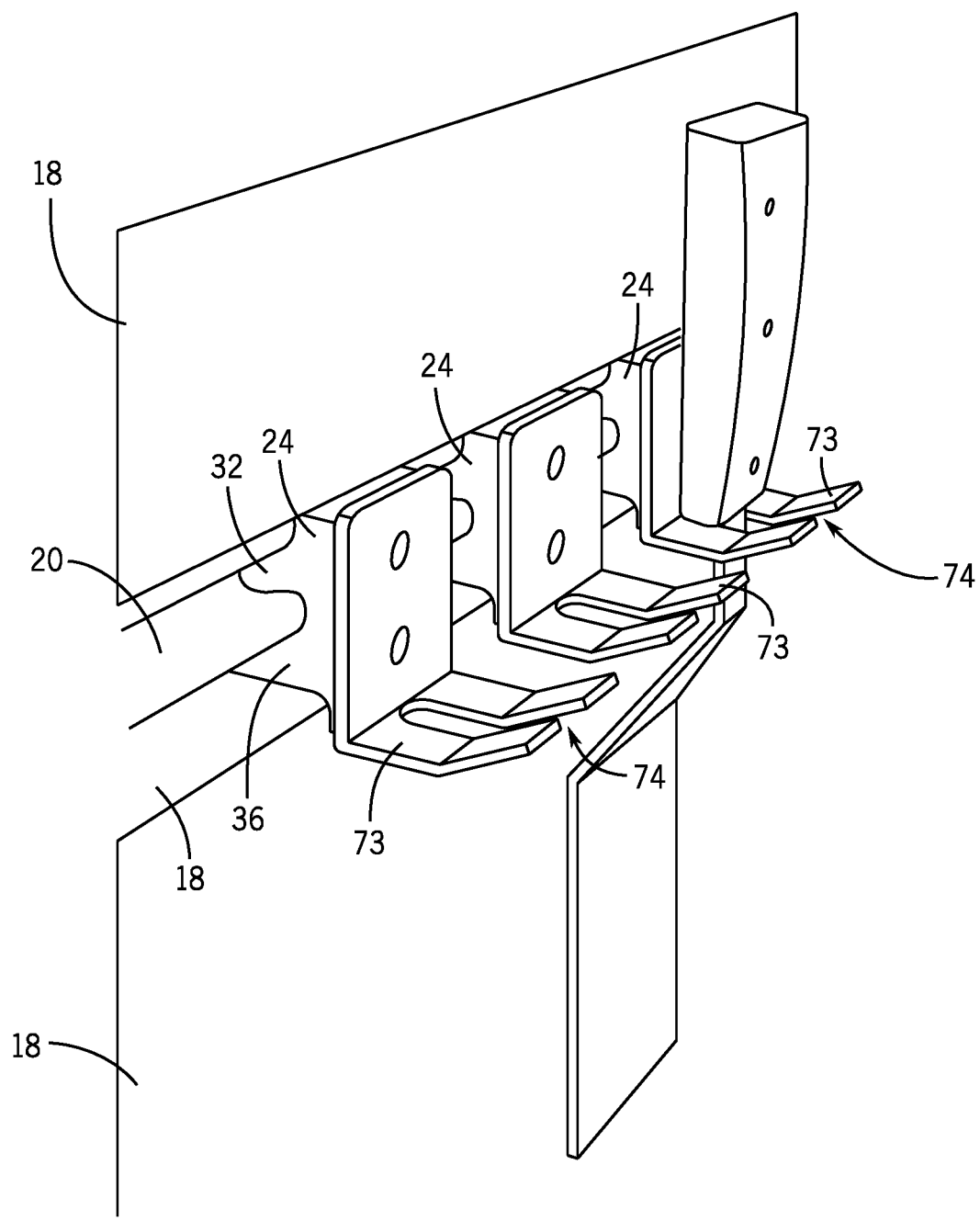
FIG. 11 is a perspective view of an exemplary embodiment of a mounting bar and multiple mechanical interfaces.

FIG. 11 depicts a spatula 75 received into a center slot 74 of an exemplary embodiment of a hook 73 that is connected to a mechanical interface 24. Three hooks 73 are depicted, and each hook member 72 is connected to a separate mechanical interface 24. The mechanical interfaces 24 are each connected to a single mounting bar 20 that extends along the length of the channel 44. That is, the mounting bar 20 is elongated in the channel 44 such that each mechanical interfaces 24 can be connected to the mounting bar 20. Different accessories, such as the spatula 75, ladles, and measuring spoons, can be received into the center slot 74 of each hook 73 to thereby support different accessories on the wall 18.

Figure 12:
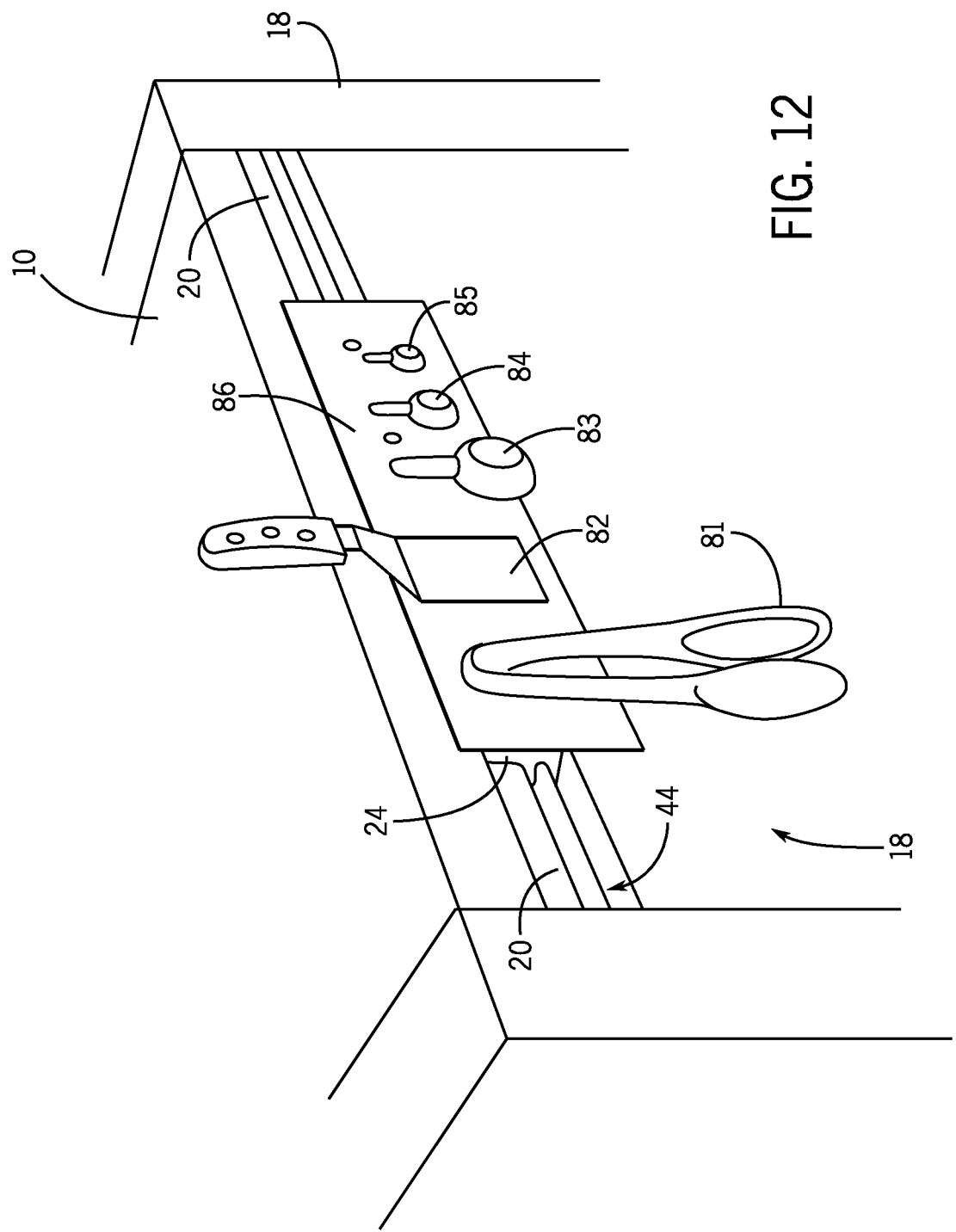
FIG. 12 is a perspective view of another exemplary embodiment of a mounting bar and a mechanical interface.

FIG. 12 depicts different kitchen accessories, a tongs 81, a spatula 82, and three measuring spoons 83, 84, 85, connected to a magnetic plate 86 which is connected to an exemplary embodiment of a mechanical interface 24. The mechanical interface 24 is connected to a mounting bar 20 as described above. In this exemplary embodiment, the accessories can be quickly connected and disconnected from the magnetic plate 86 without disconnecting the mechanical interface 24 from the mounting bar 20.

Figure 14:
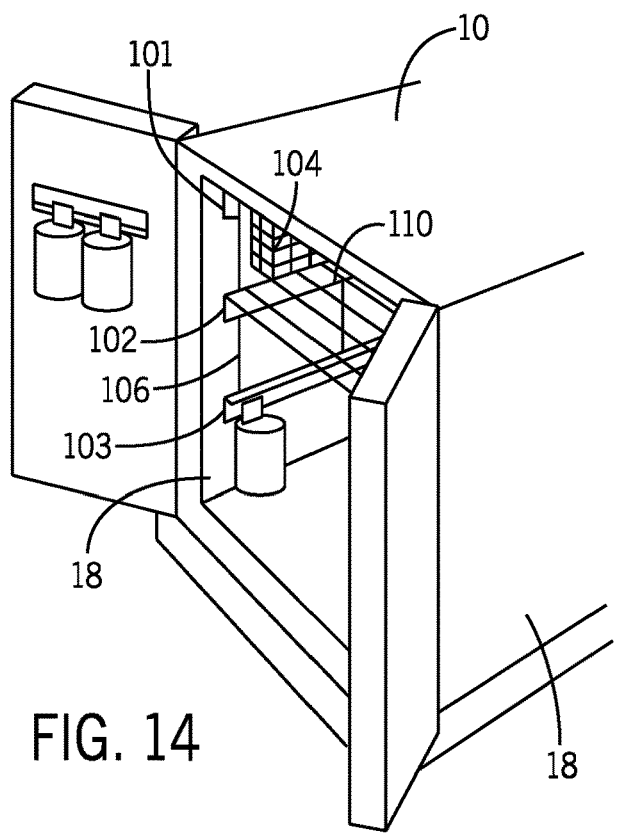
FIG. 14 is a perspective view of accessories connected to mounting bars inside a refrigeration device.

The present inventors have also recognized that it may be advantageous to utilize multiple mounting bars on a refrigeration device 10 to thereby connect large accessories, shelves, or other organizational systems to the refrigeration device 10. Referring to FIG. 14, a refrigeration device 10 has three mounting bars, namely a first mounting bar 101, a second mounting bar 102, and a third mounting bar 103, that are spaced apart and parallel to each other. A first basket 104 is connected to an alternate exemplary embodiment of a mechanical interface 106 that is generally a flat plate with a first hooked edge 107 and a second hooked edge 108 (see also FIG. 15). The first hooked edge 107 is received into the primary cavity 30 defined by the first mounting bar 101, and the first hooked edge 107 engages the mounting projection 40 of the first mounting bar 101. The second hooked edge 108 is received into the primary cavity 30 defined by the second mounting bar 102. As such, the first basket 104 is connected to the wall 18 of the refrigeration device 10 via the mechanical interface 106 and the first and second mounting bars 101, 102.

Similarly, a second basket 109 is connected to a mechanical interface 106' that is generally a flat plate with a first hooked edge 107' and a second hooked edge 108'. The first hooked edge 107' is received into the primary cavity 30 defined by the second mounting bar 102, and the first hooked edge 107' engages the mounting projection 40 of the second mounting bar 102. The second hooked edge 108' is received into the primary cavity 30 defined by the third mounting bar 103. As such, the second basket 109 is connected to the wall 18 of the refrigeration device 10 via the mechanical interface 106' and the second and third mounting bars 102, 103.

Figure 13:
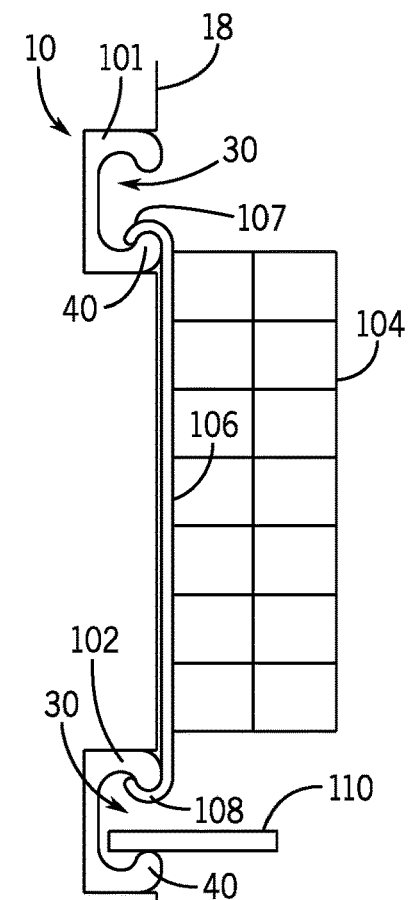
FIG. 13 is a perspective view of multiple mounting bars and mechanical interfaces for use with large accessories.
Figure 13:
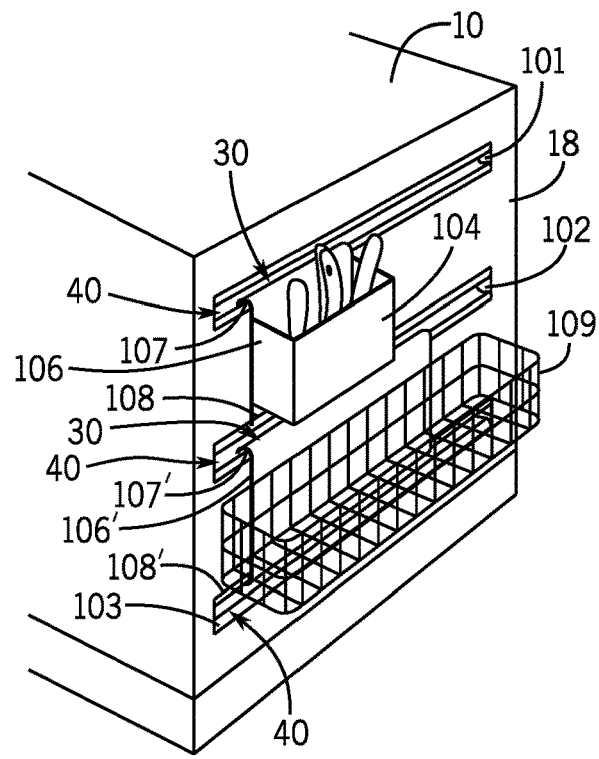
Figure 15:
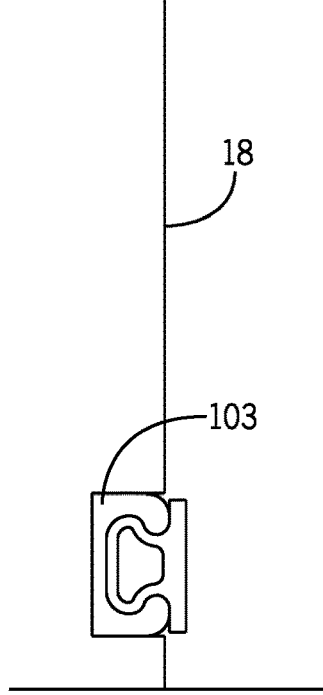
FIG. 15 is an end view of the mounting bars depicted in FIG. 14.

In another exemplary embodiment, as shown in FIGS. 14-15, a first basket 104 and a shelf 110 are shown supported inside a refrigeration device 10. In this exemplary embodiment, three mounting bars 101, 102, 103 are spaced apart and parallel to each other on the inside of the refrigeration device 10. As described above, with reference to FIG. 13, the first basket 104 is connected to a mechanical interface 106 that is generally a flat plate with a first hooked edge 107 and a second hooked edge 108 (FIG. 15). The first hooked edge 107 is received into the primary cavity 30 defined by the first mounting bar 101, and the first hooked edge 107 engages the mounting projection 40 of the first mounting bar 101. The second hooked edge 108 is received into the primary cavity 30 defined by the second mounting bar 102. As such, the first basket 104 is connected to the wall 18 of the refrigeration device 10. The edge of the shelf 110 is also received into the primary cavity 30 defined by the second mounting bar 102 and the shelf 110 rests on the mounting projection 40. The opposite edge of the shelf 110 is supported by the opposite wall 18 of the refrigeration device 10 (not shown) and/or by a mounting bar in the opposite wall 18 of the refrigeration device 10. As such, the shelf 110 is supported on the walls 18 of the refrigeration device 10 and is slidable relative to the refrigeration device 10.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mounting system for a food service apparatus, the mounting system comprising:
    a unitary wall of the food service apparatus, the unitary wall comprising an upper wall and a lower wall planar to the upper wall and defining a channel between the upper wall and the lower wall, the channel defined by a channel top, a channel back, and a channel bottom formed of the unitary wall;
    a mounting bar comprising a top wall, a bottom wall and opposing arms that extend inwardly toward each other from the top wall and the bottom wall, and the mounting bar is secured to the unitary wall within the channel the mounting bar engages at least two of the channel top, the channel back, and the channel bottom with at least one of the top wall engaging the channel top or the bottom wall engaging the channel bottom; and
    a mechanical interface coupled to an accessory and releasably engaged with the mounting bar to support the accessory on the unitary wall.

2. The mounting system of claim 1, wherein the opposing arms engage the channel back.

3. The mounting system of claim 1, wherein an open interior of the mounting bar is defined by the top wall, the bottom wall, and the opposing arms.

4. The mounting system of claim 3, further comprising an anchor bar that extends within the open interior and secures the mounting bar to the unitary wall.

5. The mounting system of claim 4, wherein the mounting bar slides relative to the anchor bar to receive the anchor bar within the open interior of the mounting bar.

6. The mounting system of claim 4, further comprising a threaded fastener that secures the anchor bar to the channel back and places a compressive force on the anchor bar that compresses at least one of the opposing arms against the channel back.

7. The mounting system of claim 1, wherein the mounting bar comprises a primary cavity defined by a partition wall of the mounting bar that extends between the top wall and the bottom wall, and the primary cavity configured to receive a projection of the mechanical interface to engage the mechanical interface with the mounting bar.

8. The mounting system of claim 1, wherein the food service apparatus is a refrigerator.

9. The mounting system of claim 1, wherein the accessory is a shelf.

10. The mounting system of claim 1, wherein the mechanical interface is a first mechanical interface and further comprising a second mechanical interface, and wherein the accessory extends between the first mechanical interface and the second mechanical interface.

11. A mounting system for a food service apparatus, the mounting system comprising:
    a unitary wall of the food service apparatus, the unitary wall comprising an upper wall and a lower wall planar to the upper wall and defining a channel between the upper wall and the lower wall, the channel defined by a channel top, a channel back, and a channel bottom formed of the unitary wall;
    a mounting bar comprising a top wall and a bottom wall, and the mounting bar is secured to the unitary wall within the channel the mounting bar engages at least two of the channel top, the channel back, and the channel bottom with at least one of the top wall engaging the channel top or the bottom wall engaging the channel bottom, the mounting bar comprises a primary cavity defined by a partition wall of the mounting bar that extends between the top wall and the bottom wall; and
    a mechanical interface comprising a projection, the mechanical interface coupled to an accessory and releasably engaged with the mounting bar to support the accessory on the unitary wall, wherein the primary cavity is further defined by a lip of the mounting bar that extends downwardly from the top wall at an end of the partition wall and wherein the projection of the mechanical interface is configured to simultaneously engage the lip and the partition wall.

12. The mounting system of claim 11, wherein the mounting bar resiliently deforms to releasably engage the projection of the mechanical interface within the primary cavity.

13. A mounting system for a food service apparatus, the mounting system comprising:

a unitary wall of the food service apparatus, the unitary wall comprising an upper wall and a lower wall planar to the upper wall and defining a channel between the upper wall and the lower wall, the channel defined by a channel top, a channel back, and a channel bottom formed of the unitary wall;

a mounting bar comprising a top wall and a bottom wall, and the mounting bar is secured to the unitary wall within the channel the mounting bar engages at least two of the channel top, the channel back, and the channel bottom, wherein the top wall engages the channel top and the bottom wall is spaced apart from the channel bottom thereby defining a secondary cavity between the bottom wall and the channel bottom; and a mechanical interface coupled to an accessory and releasably engaged with the mounting bar to support the accessory on the unitary wall;

wherein the mounting bar comprises a primary cavity defined by a partition wall of the mounting bar that extends between the top wall and the bottom wall, and the primary cavity configured to receive a projection of the mechanical interface to engage the mechanical interface with the mounting bar.

14. The mounting system of claim 13, wherein the mechanical interface further comprises a tab spaced apart from the projection of the mechanical interface, wherein when the mechanical interface engages the mounting bar, the tab is received within the secondary cavity.

15. The mounting system of claim 14, wherein when received in the secondary cavity, the tab simultaneously engages the bottom wall and the channel bottom.

16. The mounting system of claim 15, wherein the mechanical interface further comprises an engagement arm that extends generally perpendicular to the tab, and when the mechanical interface engages the mounting bar, the engagement arm engages the lower wall of the unitary wall.

17. The mounting system of claim 14, wherein one of the bottom wall and the tab resiliently deforms when the tab engages the bottom wall.

18. A mounting system for a food service apparatus, the mounting system comprising:

a unitary wall of the food service apparatus, the unitary wall comprising an upper wall and a lower wall planar to the upper wall and defining a channel between the upper wall and the lower wall, the channel defined by a channel top, a channel back, and a channel bottom formed of the unitary wall;

a mounting bar comprising a top wall and a bottom wall, and the mounting bar is secured to the unitary wall within the channel, the mounting bar configured to engage the channel top with the top wall and the channel bottom with the bottom wall, the mounting bar comprises a primary cavity defined between the top wall and the bottom wall, wherein the primary cavity is further defined by a lip of the mounting bar that extends downwardly from the top wall of the mounting bar; and a mechanical interface comprising a projection, the mechanical interface coupled to an accessory and releasably engaged with the mounting bar to support the accessory on the unitary wall wherein the projection of the mechanical interface is configured to engage the mounting bar within the primary cavity and simultaneously engage the lip of the mounting bar.

* * * * *